United States Patent [19]

Calhoun

[11] 3,784,827
[45] Jan. 8, 1974

[54] CONTAINER INSPECTION SYSTEM AND METHOD

[75] Inventor: Fredrick L. Calhoun, Torrance, Calif.

[73] Assignee: Industrial Dynamics Company, Ltd., Torrance, Calif.

[22] Filed: Mar. 5, 1971

[21] Appl. No.: 121,321

[52] U.S. Cl. ............................................ 250/106 S
[51] Int. Cl. ............................................... G21f 5/02
[58] Field of Search ................. 250/43.5 D, 83.3 D, 250/106 S, 108 R

[56] References Cited
UNITED STATES PATENTS

| | | | |
|---|---|---|---|
| 3,001,076 | 9/1961 | Crump | 250/83.3 D X |
| 3,126,484 | 3/1964 | Meeder et al. | 250/108 R X |
| 3,050,626 | 8/1962 | Dukes et al. | 250/83.3 D |
| 3,064,357 | 11/1962 | Butters | 250/83.3 D X |
| 3,132,247 | 5/1964 | Wright | 250/83.3 D |
| 3,100,841 | 8/1963 | Reider | 250/83.3 D X |
| 3,683,186 | 8/1972 | Tompkins | 250/105 |

Primary Examiner—James W. Lawrence
Assistant Examiner—Davis L. Willis
Attorney—Smyth, Roston & Pavitt

[57] ABSTRACT

An apparatus for inspecting a container to determine whether such container has properties different from a particular standard by utilizing a long life radioactive isotope source that emits low energy gamma radiation. The invention also relates to a method of making a very compact but safe housing to encapsulate the low energy gamma radiation source used in the apparatus.

The housing utilized to encapsulate the radioactive source can provide adequate shielding to protect nearby personnel by using a metal such as stainless steel because of the low energy output of the source. A thin window, formed as an integral part of the housing, freely passes a portion of the source radiation that is used for inspection purposes. The housing is constructed from standard metal bar stock in a particular manner that minimizes the possibility that the thin window will include defects or impurities contained within the metal bar stock.

A collimation means is utilized in front of the source housing window to confine the beam of radiation that emanates from the source through the window. This collimated radiation beam is directed at the area of the container to be examined and the amount of radiation passing through the container provides an indication as to whether or not the container has properties different from a particular standard.

11 Claims, 6 Drawing Figures

PATENTED JAN 8 1974 3,784,827
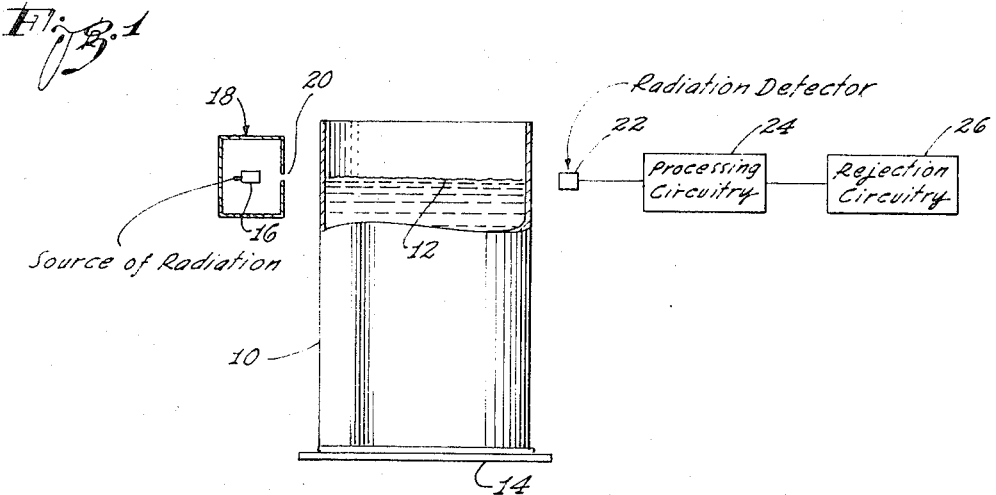
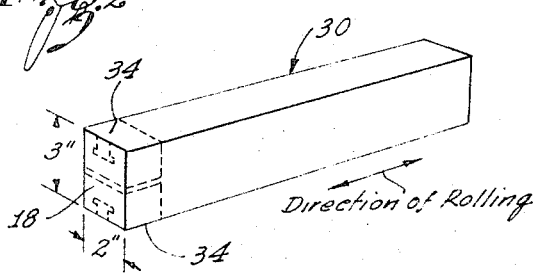
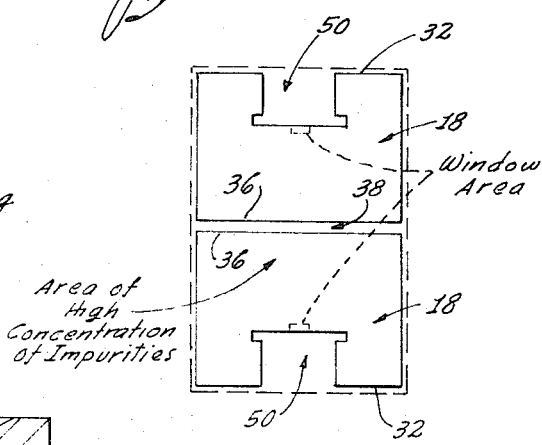
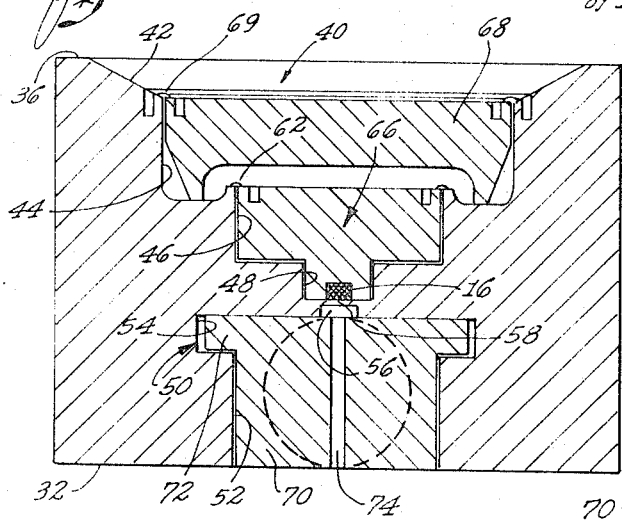
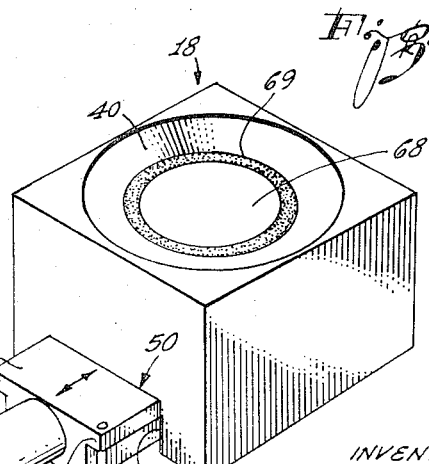
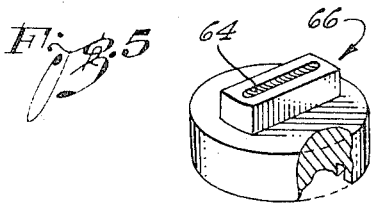
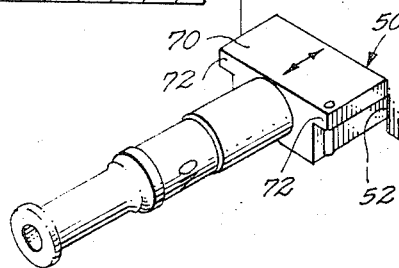
INVENTOR:
Fredrick L. Calhoun
By Smyth, Roston & Pavitt
ATTORNEYS 3,784,827

CONTAINER INSPECTION SYSTEM AND METHOD

This invention relates to apparatus for inspecting a container to determine whether such container has properties different from a particular standard. The invention also relates to methods of producing a compact sealed housing for a low energy gamma emitting radioisotope source and of assembling the housing and the source.

Radiation from radioisotopes and other sources has been used in the prior art to determine whether a container has properties different from a particular standard. For example, radiation has been passed through a container to determine whether liquid has been filled in the container to a desired height. If the liquid is filled to the desired height, radiation passing through the container at the desired height will be absorbed by the liquid. If the container has not been filled with liquid to the desired height, the radiation will pass through the container. In this way, the amount of radiation passing through the container will provide an indication as to whether or not the liquid in the container has been filled to the desired height.

The radioisotope sources previously in use to detect the characteristics of the container have had certain disadvantages primarily resulting from their properties of providing gamma radiation at high energy levels. Some typical examples of previously used radioisotopes are Cesium-137 with a gamma energy output of 661.6 KEV (thousand electron volts) and Cobalt-60 with a gamma energy output of 1331.6 KEV. One disadvantage has been that the source has had to be packed in heavy, bulky shielding units in order to be certain that the radiation from the source will not harm people standing close to the source. Another diadvantage has been that the detection of the radiation passing through the containers has not been very efficient since the radiation detectors are inherently less sensitive to high energy gamma radiation.

This invention provides a sealed radioisotope source which overcomes the above disadvantages by providing gamma radiation at a low energy level. By providing a source whose radiation is at a low energy level, the shielding for the source can be relatively small and compact. Furthermore, the radiation passing through the container can be more efficiently detected.

Although the low energy gamma radiation is easy to shield so that stray radiation will not harm personnel working in close proximity, a difficulty is encountered in providing a properly sealed housing that does not absorb all of the radiation from the source since some is required for inspection purposes. Safety requirements usually dictate the use of double fusion welds to seal all radioisotopes that are harmful to human beings. A housing must be designed so that double seals can be made and also provide a very thin section or window so the low energy radiation can pass through relatively unimpeded.

Due to the use of low energy gamma radiation, adequate shielding can be obtained from a metal such as stainless steel instead of heavier metals such as lead required by the high energy sources. The use of stainless steel or a similar metal allows the source housing to be formed so that the thin window is an integral part of the housing. This procedure cannot be used with the high energy isotopes. Since the window is very thin, in the order of only 0.006 inch, great care must be taken to insure the mechanical integrity and also to minimize the possibility of the window containing any impurities or defects that may be in the metal stock from which it is made. These imperfections in the window could cause leakage to the radioactive material and thus endanger persons in the vicinity of the housing.

The housing is made from standard rolled or elongated metal bar stock and is positioned in the bar stock so as to minimize the possibility of the window containing any impurities or defects contained in the stock. The majority of impurities in any rolled bar stock are contained in a section in the middle portion of the stock and are usually elongated in the direction of rolling. The housing is positioned in the bar stock so the thin window portion is near the edge of the stock and the plane of the window is parallel to the direction that the stock has been rolled. This procedure assures that the window will be placed in the portion of the bar stock where the minimum number of impurities and defects are located and, if such are present, they will lie in the plane of the window and not perpendicular to it. Due to the geometry described above, it is desirable, from a practical viewpoint, to make two housings from each section of bar stock. This procedure allows the full bar to be utilized.

The radioactive source material is disposed in a cavity in the housing in front of the thin window and a first shield is placed behind the source and sealed to the housing by some means such as fusion welding. A second shield is placed behind the first shield and is also sealed to said housing. This completes the basic housing and source assembly. For operational safety and maintenance purposes, a bar having a collimating aperture is slidable in another slot type cavity in front of the window. In one position of the bar, the aperture is aligned with the thin window so that radiation from the source is able to pass through the window and the aperture to the container being tested. When the bar is in position for radiation to pass through the aperture to the container, the amount of radiation passing through the container provides an indication as to the properties of the container such as the height of fill of liquid in the container. In other positions of the slidable bar, the aperture is misaligned with the thin window so that radiation from the source is unable to pass through the bar to the container.

In the drawings:

FIG. 1 is a schematic elevational view of apparatus for inspecting a container for certain properties such as the height of fill of liquid in the cotainer;

FIG. 2 is a perspective view of bar stock from which a housing included in the embodiment shown in FIG. 1 is formed;

FIG. 3 is a plan view of the end of the bar stock schematically illustrating the formation of a pair of housings from the bar stock shown in FIG. 2, the housing being shown in partially completed form;

FIG. 4 is a sectional view illustrating the construction of the housing in completed form and further illustrating the disposition in the housing of other members including a source of radiation;

FIG. 5 is a perspective view of the source of radiation shown in FIG. 4; and

FIG. 6 is a perspective view of the apparatus including the housing for providing a controlled passage of radiation to a container.

In the embodiment shown in FIG. 1, a container 10 is adapted to be tested for particular characteristics. For example, the container may be tested to determine whether it is filled with liquid 12 such as a beverage to at least a particular height. If the container is not filled at least to the particular height, a dissatisfied customer may result.

The height of the liquid in the container is determined by the apparatus schematically shown in FIG. 1 as the container is advanced by a conveyor 14 in a direction into the plane of the paper. As the container 10 is advanced by the conveyor 14, it moves past a testing station which includes a source 16 of radiation. The source 16 may be disposed in a housing schematically illustrated as 18 which shields the source 16 so that radiation cannot pass into the atmosphere in the area surrounding the source. As will be appreciated, such passage of radiation is undesirable since it may injure a person in the vicinity of the source 16. The housing 18 is provided with an aperture 20 through which radiation from the source is directed.

The source 16 may preferably constitute Americium-241. Americium-241 is advantageous since it provides gamma rays at low energy. The primary gamma output is approximately 60 KEV. Because of the low energy of the radiation, the housing 18 shielding the source 16 can be small, relatively thin-walled and compact. The low energy radiation travels through the container 10 and the liquid in the container to a detector 22 such as a scintillation counter at the opposite side of the container from the source 16.

The aperture 20 is disposed so that radiation from the source 16 passes through the container 10 at approximately the level which is desired for the liquid in the container. When the liquid in the container 10 is at or above the desired level, the liquid tends to absorb a substantial portion of the radiation from the source 16 so that only a relatively small amount of radiation passes to the detector 22. However, when the liquid in the container 10 is below the desired level, the radiation passes through the container without much absorption. Accordingly, the signal produced by the detector 22 is dependent upon the level of the liquid in the container.

The signal from the detector 22 is introduced to processing circuitry 24. The processing circuitry compares the amplitude of the signal from the detector 22 with a signal having a particular amplitude corresponding to the amplitude of the signal produced by the detector 22 when the liquid in the container is at or above the desired level. When the amplitude of the signal from the detector 22 is above the particular amplitude, the processing circuitry 24 introduces a signal to rejection circuitry 26 to obtain a rejection of the container. This rejection is delayed for a short period of time so that the container can move past the inspection station. When the container is rejected, it is diverted from the conveyor 14 to a rejection station.

It will be appreciated that the apparatus shown in FIG. 1 and described above for determining the height of fill of liquid in a container is only by way of illustration and that the same apparatus can be used for a number of other tests. For example, the system including the radiation source 16 and the detector 22 can be used to detect cartons to determine that the cartons are fully stacked with the containers in a number of different rows and columns in the cartons. If a container is missing from a carton, the rejection circuitry 26 is operated to divert the carton to the rejection station.

The housing 18 may be constructed in a manner similar to that illustrated in FIG. 4. The housing 18 may be made from a suitable metal such as a Type 304 stainless steel having a low carbon content. A metal such as stainless steel may be used since it absorbs the radiation from the source 16 because of the low energy gamma rays from the source. Preferably, the stainless steel is vacuum melted when it is formed since vacuum melting eliminates the majority of impurities such as inclusions and stringers during the melting process. Impurities such as inclusions and stringers are undesirable since they provide weak spots where breaks may occur in the thin metal window such that radioactive material from the source may be able to permeate through such breaks and endanger the lives of persons in the vicinity of the source. The impurities are mainly composed of oxides, sulfides, silicates and corundum.

When the stainless steel for the housing 18 is vacuum melted to form bar stock such as illustrated at 30 in FIG. 2, the stringers and inclusions are located in the highest density at the center of the bar stock. These stringers and inclusions tend to extend in a direction parallel to the direction of rolling of the bar stock so that the inclusions and stringers would tend to extend from the left to right in FIG. 2. As will be described in detail subsequently, the housing 18 is formed in a manner to minimize the existence of any impurities such as inclusions and stringers in the housing.

As previously stated, it is desirable to make a pair of housings from each section of bar stock so that the entire cross section of the stock can be utilized. Pairs of housings 18 are formed so that ends 32 of the housings constitute ends 34 of the bar stock. This places the window areas near the edge of the bar stock where the minimum number of defects and inclusions are located. The area of high concentration of defects and inclusions 38 is near the ends 36 of the housings. This is not a critical area of the housings and most of the metal in this area is machined away to form the cavity in which the source is placed.

The cavity 40 is provided with a beveled edge 42 at its outer end, the beveled edge having a relatively great diameter. The cavity 40 also includes a straight-walled portion 44 extending inwardly from the beveled edge 42 and having a relatively great diameter. A cavity portion 46 having a reduced diameter extends inwardly from the cavity portion 44 and a cavity portion 48 having an even further reduced diameter extends inwardly from the cavity portion 46.

A slot cavity generally indicated at 50 is provided in the end 32 of the housing. The slot cavity 50 is provided with a portion 52 of an intermediate width and with a portion 54 of increased width. A cavity portion 56 of relatively small width extends inwardly from the cavity portion 54 to define a thin window 58 with the cavity portion 48. The window 58 has a thickness in the order of 0.006 inch. This thickness is not sufficient to prevent radiation from the source 16 from passing through the window. Since the window 58 is relatively thin, any stringers or other imperfections in the window could possibly become loosened during machining of the window since they are vulnerable to any mechanical stress or corrosion.

The source 16 may be formed from Americium-241 mixed with a suitable material such as ceramic enamel.

For example, the ceramic enamel may contain approximately 100 millicuries of Americium-241. The enamel is fired at a suitable temperature such as approximately 1,100° C. in a slit 64 in a retainer shield 66 (FIG. 5) which is made from a suitable material such as Type 304 stainless steel. By disposing the Americium-241 in the ceramic enamel and firing it into the retainer shield 66, any tendency for the Americium-241 to migrate outside of the housing is minimized even of the window 58 should be accidentally punctured.

The retainer shield 66 is shaped so that it fits snugly in the cavity portions 48 and 46 in the housing, with the source 16 being disposed adajcent the window 58. The retainer shield 66 is suitably sealed to the housing as at 62. A second shield 68 made from a suitable material such as Type 304 stainless steel is in turn disposed in the cavity portion 44 to cover the retainer shield 66 and is suitably sealed to the housing as at 69. The method described above provides a double seal thus minimizing the possibility of any radioactive material leaking from the source housing.

A sliding shield or bar 70 made from a suitable material such as a Type 304 stainless steel is disposed in the cavity slot 50 of the housing 18 and is provided with flange portions 72 for disposition in the cavity portion 54. The sliding shield 70 is slidable in the cavity slot 50 and is provided with a collimating aperture 74 (FIG. 4) which extends through the sliding shield 70 for alignment with the window 58 in one position of the shield.

When the collimating aperture 74 is aligned with the window 58, radiation from the source 16 is able to pass through the window and the aperture to the container 10 to provide an indication of the properties of the container. However, when the sliding shield 70 is moved to a position in which the collimating aperture 74 is misaligned with the window 58, the sliding shield 70 blocks the passage of radiation to the container 10. The sliding shield 70 is used as a safety device to effectively block the radiation from the source when maintenance is required in the unit. The sliding shield 70 is usually placed in the closed position when the equipment is not operating. The sliding shield 70 could be replaced by a shield and collimating aperture that is an integral part of the source housing if desired, but the sliding shield and aperture offers more versatility to the unit.

In this way, the housing 18 is provided with the window 58 in a manner such that no impurities such as inclusions or stringers are provided in the window. By preventing the disposition of any impurities in the window, breaks or holes cannot occur in the windows to allow the radioactive material to permeate through the breaks and holes and endanger the health and safety of persons in the immediate vicinity of the housing. The window is disposed adjacent the source 16 so that radiation from the source is able to pass through the window and the aperture 74 in the shield when the shield is properly disposed relative to the window.

Although this application has been disclosed and illustrated with reference to particular applications, the principles involved are susceptible of numerous other application which will be apparent to persons skilled in the art. The invention is, therefore, to be limited only as indicated by the scope of the appended claims.

I claim:

1. An improved relatively compact, sealed radioisotope source of low energy gamma for use in nuclear gauging apparatus wherein various materials are inspected, comprising a housing of a metal tending to have impurities present as a result of the processing of such metal, said housing including means defining a first and second formed cavity at opposite ends thereof, one of said cavities including a bottom wall and being in a portion of said housing substantially free of impurities, the other of said cavity being so positioned that the bottom wall thereof is located in a portion of the housing tending to be substantially free of impurities while the cavity is formed in that portion of the housing tending to be the area of relatively high concentration of impurities, said cavities being spaced from each other such that the spaced respective bottom walls form a thin low energy gamma transmitting window which is integral with said housing, a source of radioactive material so sealed in said first cavity adjacent to said window as to provide low energy gamma radiation which passes through said window, said window being substantially free of metallic impurities tending to cause leakage of said source material from said first cavity, and movable means in said second cavity for alignment with said window in one position for collimating the emanating radiation and for blocking the passage of radiation in a second position thereof.

2. In an apparatus as set forth in claim 1 further including shield means in said first cavity at a position external to the source material and sealed to the housing to prevent leakage of source material from the housing through the first cavity and blocking all radiation through the first cavity so that emanating radiation passes only through said integral window.

3. In an apparatus as set forth in claim 1 wherein said movable means includes a bar movably disposed in said second cavity and including a collimating aperture for alignment with the window, in one slidable position of the bar, to provide for passage of gamma rays from the source through the window and aperture.

4. In an apparatus as set forth in claim 1 wherein said source material is an Americium-241 radioisotope.

5. In an apparatus as set forth in claim 1 wherein said housing is of low carbon vacuum melted stainless steel.

6. In an apparatus as set forth in claim 5 wherein said steel is a Type 304 stainless steel.

7. In an apparatus as set forth in claim 1 wherein said window has a thickness of less than 0.01 inches.

8. In an apparatus as set forth in claim 7 wherein said window has a thickness of 0.006 inch.

9. In an apparatus as set forth in claim 2 wherein said shield means includes a first shield adjacent to the source and sealed to the housing and a second shield overlying said first shield and sealed to said housing.

10. In an apparatus as set forth in claim 1 wherein said housing is made from rolled bar stock, said second cavity and said window being located in that portion of said bar stock containing the minimum, if any, metallic impurities.

11. An improved compact radioactive source for use in nuclear gauging wherein the emitted radiation is low energy gamma, comprising a metal housing having a portion thereof of reduced metal impurities and defects, and a portion tending to include a relatively high concentration of metal impurities and defects, means forming a first cavity including a bottom wall in that portion of the housing of reduced metal impurities, a second cavity so positioned as to be opposite said first cavity and oriented such that the bottom wall thereof is spaced from the bottom wall of the first cavity, the bottom wall of said second cavity being in a portion of said housing substantially free of impurities and said second cavity being located in a portion of said housing tending to have a relatively high concentration of metal impurities, said cavities being spaced from each other such that the spaced bottom walls thereof define a relatively thin window integral with said housing and being that portion of said housing separating said first and said second cavities, a source of radioactive material received in said second cavity and positioned adjacent to said window, means sealing said radioactive material in said second cavity whereby gamma radiation emanating therefrom passes through said window, and collimating means positioned in said first cavity and movable to a position in alignment with said window for collimating said emanating gamma radiation and being movable to another position obstructing emanation of gamma radiation from said housing.

* * * * *